United States Patent [19]

Rogers et al.

[11] 3,945,923
[45] Mar. 23, 1976

[54] MODULAR WATER FILTER

[75] Inventors: Robert N. Rogers, Des Plaines; Michael O. Saar, Addison, both of Ill.

[73] Assignee: Eaton Corporation, Cleveland, Ohio

[22] Filed: May 20, 1974

[21] Appl. No.: 471,255

[52] U.S. Cl. ............... 210/253; 210/260; 210/299; 210/317; 210/323 T; 210/444; 210/494; 210/497.1
[51] Int. Cl.² B01D 27/06; B01D 25/06; B01D 25/20
[58] Field of Search ............ 210/39, 167, 134, 289, 210/294, 295, 296, 299, 300, 330, 335, 442, 494, 253, 260, 317, 323, 444, 497.1

[56] References Cited
UNITED STATES PATENTS

| | | | |
|---|---|---|---|
| 1,347,932 | 7/1920 | Bowman | 210/335 X |
| 1,942,584 | 1/1934 | Weinstein | 210/335 |
| 2,478,109 | 8/1949 | Kamrath | 210/442 X |
| 2,507,818 | 5/1950 | Sager | 210/442 |
| 2,525,330 | 10/1950 | Zaun | 210/442 |
| 3,112,262 | 11/1963 | Parkinson | 210/494 X |
| 3,390,778 | 7/1968 | Uhen | 210/335 X |
| 3,415,384 | 12/1968 | Kasten | 210/494 X |
| 3,436,343 | 4/1969 | Smith | 210/39 |
| 3,497,452 | 2/1970 | Arranitahis | 210/39 |
| 3,561,602 | 2/1971 | Molltor | 210/335 |

*Primary Examiner*—Theodore A. Granger
*Attorney, Agent, or Firm*—Teagno & Toddy

[57] ABSTRACT

A modular filter assembly for cleaning and polishing of potable waters including a fabric turbidity removal module and an adsorptive taste and odor removal module. The modules are connected in series so as to have turbidity removal prior to taste and odor removal to extend the operating life of the taste and odor removal module. The turbidity removal module includes a porous, fabric material assembly which is of a rolled or wrapped construction which provides a large filtration area to prevent its clogging prior to the utilization of the adsorptive capabilities of the taste and odor removal module. The turbidity removal module includes a flow grid assembly having inner and outer flow grid to maximize the distribution of the fluid being filtered over the filtration area of the module and to assure lateral flow of the filtered fluid through the module. The modular construction enables the turbidity removal module to be utilized separately and renders the module self-cleaning when operated under certain flow conditions. The taste and odor removal module is provided with flow dispersion means which serves to reduce the flow velocity of the filtering fluid through the module to prevent channeling and maximize the adsorptive capacity of the absorptive material contained in the module.

5 Claims, 12 Drawing Figures

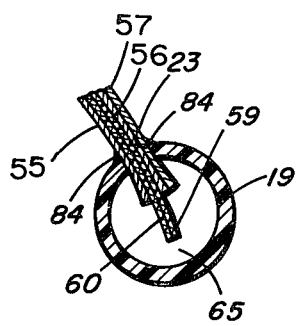 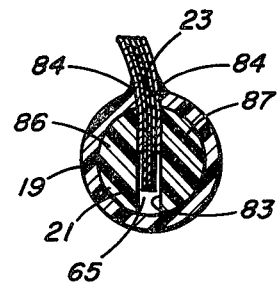
FIG. 6    FIG. 7
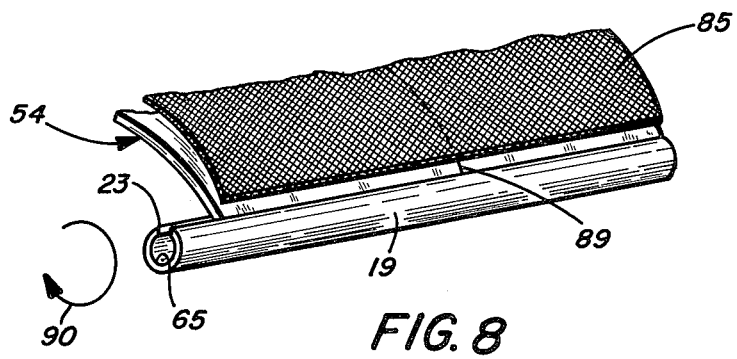
FIG. 8
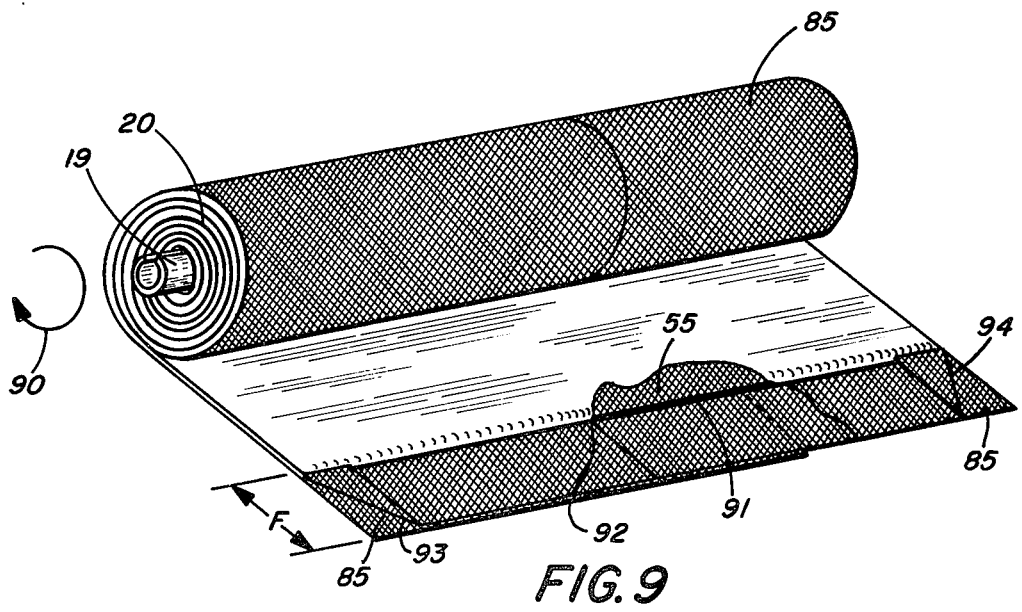
FIG. 9

MODULAR WATER FILTER

BACKGROUND OF THE DISCLOSURE

The present invention relates to a filter construction, and more particularly, to a filter construction for use primarily in cleaning and polishing potable water, although it may be used for filtering other fluids, such as milk or the like.

In the past, it has been known that the absorptive capacity of the carbon material in prior filter devices has been only partially utilized when such filter devices have failed. It has also been known in filter devices which utilize adsorptive material, such as carbon granules, that turbidity removal has been known to cause the elimination of the surface area of the carbon granules which contribute to their adsorptive capacity. Elimination of this effective surface is primarily the result of coating and eventually results in bridging and channeling through the carbon granules, and ultimately in prohibitive pressure drops with complete non-performance of the filtering device.

Therefore, it has become desirable to design and manufacture a filter device in which turbidity removal will prevent a premature failure of the device prior to a substantial usage of the adsorptive capacity of the carbon material contained therein while still yielding a filtrate of the highest possible quality. More particularly, the filter device must be constructed so as to have an extremely large filtration area while being relatively small and compact in overall size. Still further, the filtration area must be large enough so as to enable the use of filter materials which have a pore size capable of yielding the high grade effluent desired without resulting in prohibitive pressure drops.

SUMMARY OF THE INVENTION

The present invention contemplates providing an improved filter construction for cleaning and polishing of potable water. More particularly, the present invention provides a filter construction which is of a modular design, and which in one form, provides for the separation of the function of turbidity removal from the function of taste and odor removal. More specifically, the filter construction includes at least one module which is formed by the spiral-wrapping of a fabric filter material assembly so as to achieve a substantially greater filtration area when compared to prior filtration devices having a comparable size and flow rate. The fabric material assembly comprises an envelope-type construction which includes an outer fabric filter sheet which is formed or folded about an internal flow grid. The internal flow grid is formed by a pair of grid strips having a uniform, preselected pattern so as to prevent nesting thereof and to allow for lateral flow along the interval flow grid to maximize the filtration capability of the surrounding sheet of filter material. An exterior grid is disposed outwardly of the folded envelope and is wrapped with the envelope to provide a separation between the spiraling layers of the fabric material assembly as an entrance separation for the liquid being filtered resulting in a pressure-balanced flow through the filter module. The envelope utilizes a lap construction having a seam on one side and along which the external grid is laid during the wrapping process. The wrapping is performed so as to maintain the seam and the external grid on the outside to apply tension along the seam for retaining the outer lap of the envelope in tight sealing engagement with the inner lap to prevent leakage in the completely wrapped condition of the fabric material assembly. The entire fabric material assembly is wrapped about a hollow core which is connected in fluid communication with the interior grid so as to enable the filtrate from the filter module to pass to another filtration stage, when desired.

In the present invention, a secondary filtration state is provided in the form of a carbon granule filter module to provide taste, odor, and chlorine removal in the filtration process. In the carbon filter module, the carbon granules are separated by sets of layered discs which are adapted to distribute the flow through the carbon filter module and to prevent the escape of the carbon granules therefrom. More particularly, a set of discs is disposed at either end of the carbon filter, and one set is disposed generally intermediately therebetween. Each of the sets of discs includes 2 sheets of filter material having a relatively fine pore size so as to prevent the passage of the carbon granules therethrough, but capable of allowing the free flow of the filtering fluid, such as water, therethrough. The filter material forms a sandwich with one layer of a different filter material having a relatively larger pore size which functions primarily to distribute the flow over the entire transverse dimension of the carbon filter module, and thus, prevent channeling through the carbon granules by the filtering fluid flowing therethrough.

As can be seen, there is provided a filter assembly wherein turbidity removal has been separated from taste and odor removal such that the turbidity is prevented from prematurely terminating the operating life of the carbon filter module. More particularly, a spirally-wrapped filter module for turbidity removal is constructed so as to have an extremely large filtration area yet contains a filter material having an extremely small pore so as to yield an extremely high grade effluent. In such an arrangement, the turbidity filter module is capable of extremely long life and permits continued use of the entire filter assembly until such time that the adsorptive capacity of the carbon granules in the carbon filter module is substantially utilized. Still further, the entire assembly is of a compact construction resulting in a size comparable to other known filter devices of the same or lower flow rates.

BRIEF DESCRIPTION OF THE DRAWINGS

FIG. 6 is a transverse sectional view taken along the line 6—6 of FIG. 5.

FIG. 7 is a transverse sectional view taken along the line 7—7 of FIG. 5.

FIGS. 8 to 11 show various filtering stages to form the turbidity removal module of the present invention.

DESCRIPTION OF THE PREFERRED EMBODIMENT

Figure 1:
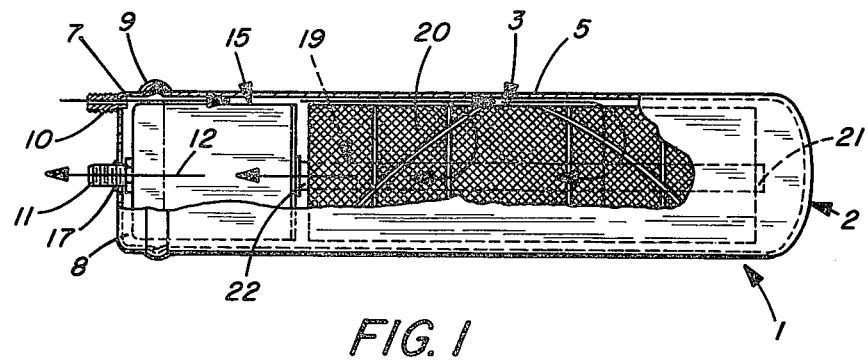
FIG. 1 is a side elevation, partly cut away, showing one form of filter construction of the present invention.
Figure 2:
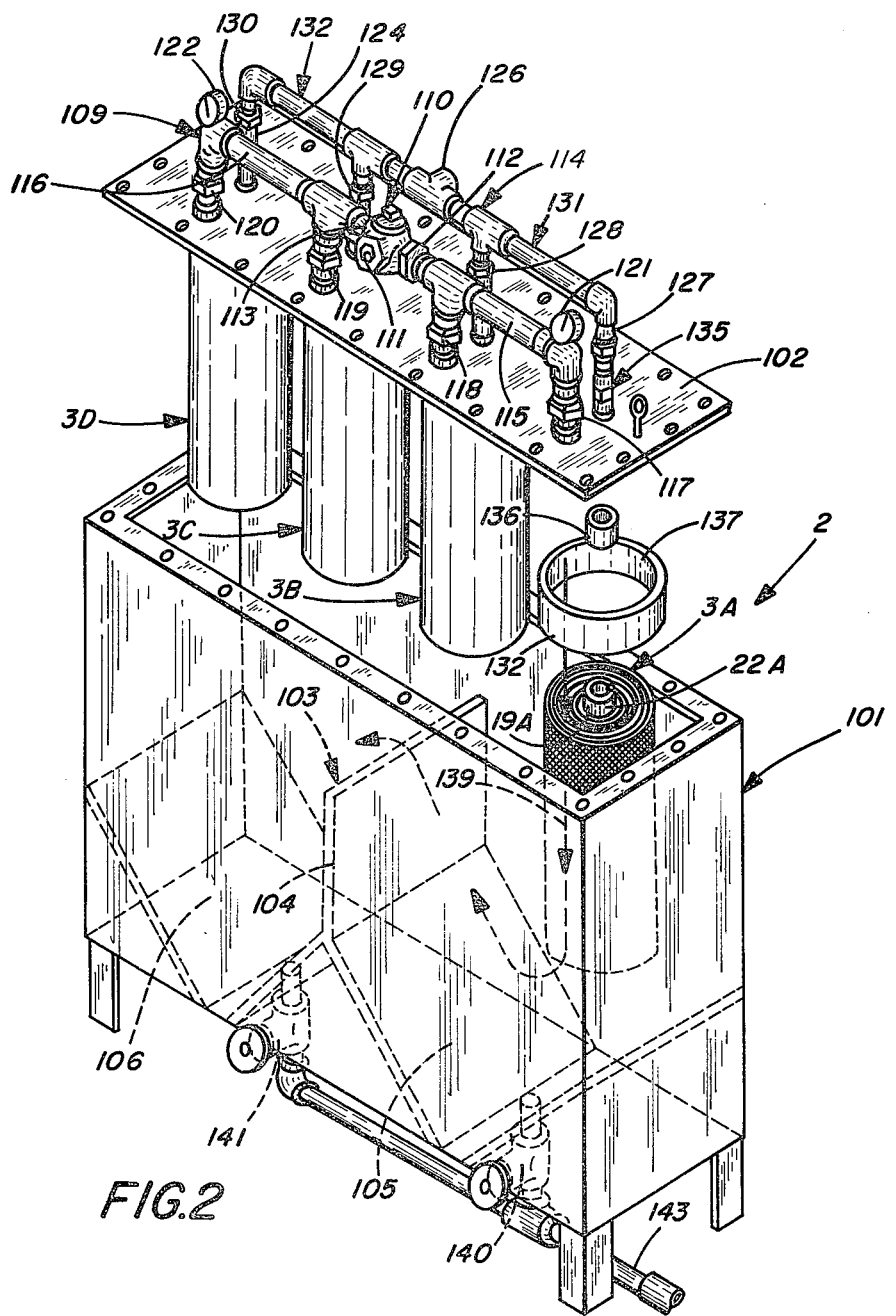
FIG. 2 is a perspective assembly view of still another form of filter construction of the present invention.
Figure 3:
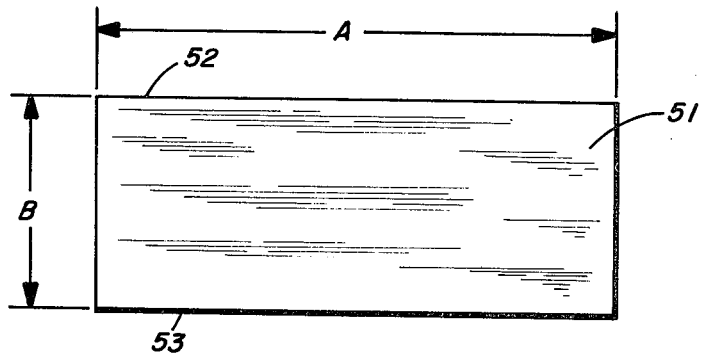
FIGS. 3 to 5 show various stages of the formation of the turbidity filter module of the present invention.
Figure 4:
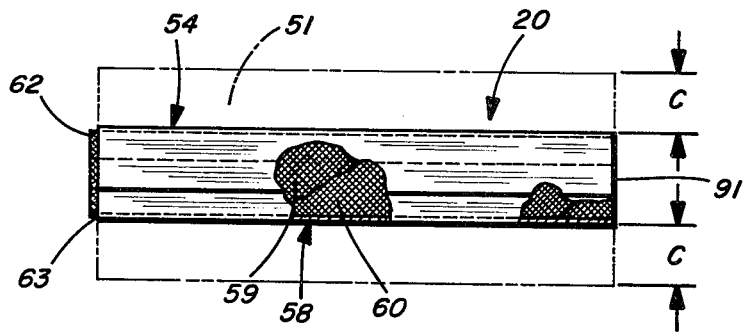

In FIGS. 1 and 2, there is illustrated two or dual filter assemblies 1 and 2 embodying the fabric filter module, designated generally at 3, of the present invention. The embodiment shown in FIG. 1 may be of the canister-type construction which would be used for filtering drinking water, milk or the like, and the filter assembly 2 is typical of a self-cleaning tank-type construction which includes a settling stage in the filtration process for filtering of liquids having larger and/or heavier suspended particles therein.

Referring now specifically to FIG. 1, the filter assembly 1 comprises a sealed canister 2 having a hollow, cylindrical body 5 which is open at one end, as at 7. A cap 8 is fitted over the open end and is secured to the body by clamp 9. An annular seal 6 is provided between the cap 8 and the body 5 to assure tight fitting engagement therebetween. The cap 8 includes an inlet fitting 10 for the entrance of contaminated fluid, such as water or the like, into the body and an outlet fitting 11 to enable the discharge of the filtrate from the body. The fittings 10 and 11 may be provided with threads on their exterior sides to enable connection with suitable exterior conduits as needed.

Figure 12:
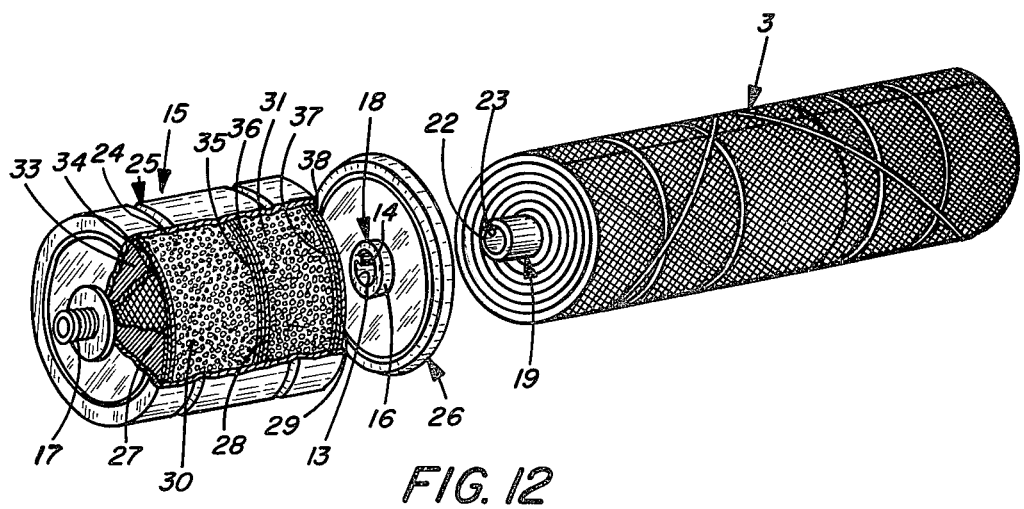
FIG. 12 is a perspective assembly view of the filter module construction of the present invention with the carbon filter module shown partially cut away.

As shown, the filter assembly 1 is of a two or dual module construction having an adsorptive filter module 15, which contains an adsorptive material such as carbon granules or the like, which is connected in series with the fabric filter module 3 within the canister 2. Referring now to FIGS. 1 and 12, the filter module 15 is mounted adjacent the open end of the body 5 and includes an outlet fitting 17 at one end and an inlet fitting 18 at the opposite end with the outlet fitting 17 being connected in fluid communication with the fluid fitting 17. The filter module 3 includes a hollow, cylindrical core 19 about which a porous, fabric material assembly 20 is wrapped such that the filtrate passing through the fabric material assembly 20 will flow into the core 19. One end of the core 18 is closed, such as by plug 21, while the opposite end 22 of the core 18 is open and defines an outlet fitting for connection to the inlet fitting 18 of the filter module 15 in fluid communication with the filter module 3. As shown, the filter modules 3 and 15 are spaced from the walls of the canister body forming an air chamber to allow for the passage of fluid and which acts as a shock absorber to reduce the shock of water hammer. By this arrangement, fluid to be filtered enters the canister 2 through the fitting 10 and flows around the outside of the filter module 15. The fluid is initially filtered through the fabric material assembly 20, and the filtrate therefrom flows into the core 18. The filtrate then flows into the filter module 15 wherein it is again filtered with the resulting filtrate flowing outwardly through the fitting 17 and 11. In this process, the filter module 3 functions essentially for turbidity removal, whereas, the filter module 15 functions essentially for taste and odor removal. The wrapped spiral construction of the filter module 3 provides a large filtration area, which will be discussed in greater detail hereinafter, which enables turbidity removal prior to the passage of the filtering fluid into contact with the carbon granules of the filter module 15 so as to enable a more effective and efficient use of the adsorptive ability of the carbon granules and extend the operating life of the filter module 15.

Referring now particularly to FIG. 12, the filter module 15 comprises an outer casing 24 having an open ended body 25 and an end cap 26 adapted to cover the open end. As shown, the casing 24 is of a generally cylindrical configuration having a maximum diameter which is less than the minimum diameter of the interior of the canister 2 so that the incoming fluid may flow around the exterior side of the casing 24 toward the filter module 3 at the opposite end of the canister 2 at a preselected flow rate. It is to be understood, that the size of the various components of the filter assembly 1 can be dimensioned so as to achieve different flow rates. Although the filter assembly 1 has been primarily designed for use in cleansing and polishing potable waters, it will be understood by those skilled in the art that such could be applied for use in filtering other fluid mediums.

Preferably, the casing 24 is made of a non-biodegradable chemically-inert material, such as polypropylene or the like so as to minimize the chance of any chemical reaction between the filtering fluid and the components which make up the filter assembly 1. The outlet fitting 17 comprises a hollow tube which is centered at one end of the casing 24 and is made of the same material as the casing 24 being threaded externally for connection with threads formed internally of the outlet fitting 11. The inlet fitting 18 is shown as comprising a hub 16 disposed in the end cap 26 so as to be axially aligned with the outlet fitting 17. As shown, the hub 16 includes an opening 13 which is formed fitting to receive the end 22 of the core 18, such as by press fit or the like. More particularly, the hub 16 includes a key 14 formed integral therewith for slidable insertion into a keyway or slot 23 formed in the end 22 for locking the core 19 against rotation within the hub 16 and to facilitate a sealing connection between the core 9 and the cap 26.

As shown in FIG. 12, flow dispersion chambers are provided which are formed by three primary or inner screens 27, 28, and 29. The screens 27, 28, and 29, in the form shown, are circular in configuration and are preferably made of polypropylene material, such as Vexar 40 PDS-89, which is a trademark designation for a product manufactured by DuPont. Screens 27 and 29 are disposed at the opposite ends of the casing 25 while the other screen 28 is positioned intermediate the screens 27 and 29 at the longitudinal center of the casing 25. The screens 27, 28, and 29 have diameter substantially the same as the interior side of the casing 25 such that all of the fluid flowing through the casing 25 must pass through the screens 27, 28, and 29.

Carbon granules, as at 30 and 31, are disposed in the spaces between the screens 27, 28, and 29. Preferably, the carbon granules 30 and 31 are of an extremely hard type and have a high resistance to chafing, such as grade 718 manufactured by the WITCO Chemical Company.

To prevent the escape of the carbon particles 30 and 31 with the filtrate, secondary or outer screens 33 to 38 (FIG. 12) are disposed at opposite sides of the primary screens 27, 28, and 29. These secondary screens, as shown, also are circular in configuration, having a diameter which is substantially equal to the diameter of the primary screens 27, 28, and 29. Preferably, the secondary screens are made of a non-woven polypropylene material, such as Typar, which is a trademark designation for a product manufactured by DuPont. It has been found that Typar having a weight of 2 ozs. per yard, effectively blocks the passage of carbon particles while allowing the filtering fluid, such as water, to pass freely therethrough.

The end cap 26 is joined to the main body 25, such as by a suitable polypropylene adhesive, to provide a completely sealed module. As shown, the end cap 26 and the opposite end of the main body 24 are formed with annular pressure rings 33 and 38 which are disposed radially outwardly of the fittings 17 and 18. The fittings 17 and 18 project axially inwardly of the casing into pressured contact with the adjacent screen to prevent the possibility of the escape of carbon particles around the outer periphery of the screens.

In FIGS. 3 to 11, there is shown one typical filter module 3 which, when made in a size so as to have an approximate length of 11 inches, and a diameter of 4 inches, will in the final assembled condition have a comparatively large filtration area capable of providing a high grade effluent having particles less than 0.045 microns, at a flow rate of 1½ gal. of water per minute. Again, the various components of the filter module 3 are preferably made of a non-biodegradable chemically-inert material, such as polypropylene or the like.

As previously stated, the fabric material assembly 20 is wrapped about the core 19 and may be made of Cycolac (T) which is a trade designation of an ABS product of food grade manufactured by Borg Warner. This material is used because of its rigidity, and because it is readily dissolvable in certain known solvents which enable some of it to be dissolved to a viscosity which is suitable for use as an adhesive in the construction of the filter, as will be described more fully hereinafter. In the size of the embodiment referred to above, the core 19 will preferably have a thickness of approximately ⅛ inch and an outside diameter of approximately ¾ inch and an inside diameter of approximately ½ inch. The core 19 is cut to have a length of approximately 11½ inches and is formed with a slot 23 (FIGS. 5 to 8) which may extend throughout its entire length and have a width of approximately 0.075 inch, being sized to fit the key 14 of the hub 16. In addition, the marginal edges of the core defining the slot 23 may be cut on a bias with respect to a plane extending coaxially outwardly from the longitudinal center of the core. The width of the slot is approximately 1/16 inch.

The fabric material assembly 20 comprises a plurality of layers of fabric materials which are rolled or wrapped in spiral relation about the core 19 to provide a large filtration area, as for example 10 sq. ft., as referred to above. More particularly, a porous fabric sheet 51 of Tyvek No. 1085-D (FIG. 3), which is a trademark designation for a non-woven fabric manufactured by DuPont is used, being preferred over woven fabrics, in that known available woven fabrics do not offer as fine a pore size to yield the high grade effluent desired. The sheet 51 is initially formed in a rectangular shape having a width, such as the dimension B, of 24 inches, and a length, such as the dimension A, of 6 ft. 4 inches. Two folds are made of lengthwise direction of the sheet 51 inwardly from its lengthwise edges 52 and 53 to form an enveope 54 (FIG. 4), having a back layer 55, and inner front lap layer 56 and an outer front lap layer 57. The folds are made in the sheet 51 along lines which are spaced, such as a distance C, of 6¾ inches inwardly from the edges 52 and 53 so that the outer front lap layer 57 overlaps the inner front lap layer 56 a distance, such as the dimension D (FIG. 5) of approximately 3 inches at the longitudinal center of the sheet 51, resulting in a width of 10½ inches, such as dimension E, for the envelope 54.

Figure 5:
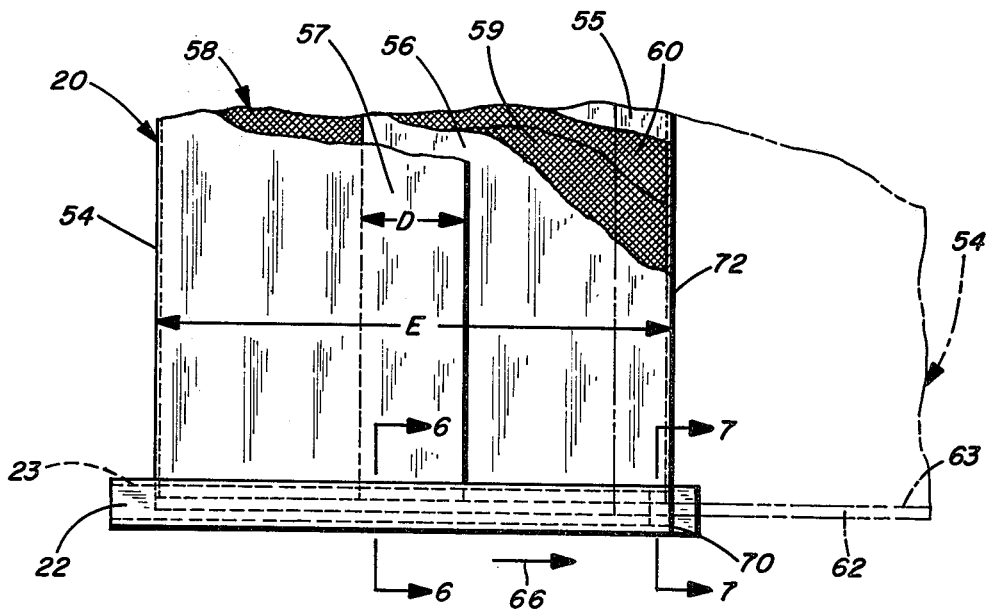

An interior grid assembly 58 is provided for insertion within the envelope 54. The interior grid assembly 58 includes a pair of grid members or strips 59 and 60 which are disposed in juxtaposed, face-to-face relation within the envelope 54. The strips 59 and 60 are preferably made of flat strips of fabric material known as Vexar 20-PDS, which is a trade designation for a product manufactured by DuPont. This material provides an open grid pattern which, when used in the proper manner, prevents nesting between the strips 59 and 60 so as to allow for the desired lateral flow of the filtering fluid between the back layer 55 and the front lap layers 56 and 57 of the envelope 54 (FIG. 5). More specifically, this material is formed so as to have a diamond-shaped pattern defined by one set of coplanar strands which extend diagonally, such as right to left, and an acute angle with respect to the lengthwise dimension of each strip and another set of coplanar strands which extend, such as left to right, at an equal acute angle to the lengthwise dimension of the strips. Thus, each strip 58 and 59 provides an individual grid strip which contain a definite pattern of uniform, downwardly extending high points on each side to allow unidirectional flow of fluid therethrough, as well as pinpoint support for the filter sheet 51 to discourage movement relative thereto. When the two strips 59 and 60 are laid one upon the other so as to have the same orientation, the confronting coplanar layers will extend transversely to one another to prevent nesting therebetween. In addition, when the two strips 59 and 60 are rolled, as a unit, into a spiral configuration, a curvilinear change will occur which offsets the respective high points of the confronting layers and the respective junctions of the strands of the coplanar layers of each strip so as to entirely eliminate any possibility of nesting between the two strips 59 and 60. By this arrangement, the strips 59 and 60 form a structure which maintains a physical separation or spacing between the back layer 55 and the front lap layers 56 and 57 of the envelope 54 to assure lateral flow therebetween by preventing choking off of the flow of fluid through the interior grid as a result of the sagging and stretching of the sheet material 51 to conform to the outer high and low points of each of the strips resulting from flow pressures produced by the fluid flow through envelope 54.

In the form shown, the two grid strips 59 and 60 are cut to approximately the same width as the envelope 54 or to a size exactly 10½ inches wide, and 6 ft. long, and are placed inside the envelope 54 such that a portion of the coinciding ends, such as at 62, off each of the strips extends approximately ¼ inch beyond one edge, such as the inner edge 63, of the envelope 54. As best shown in FIGS. 5 and 6, one end of the fabric material 20 is inserted into one end of the slot 23 such that a portion of the lower edge 63 of the envelope 54 and the ends 62 of the strips 59 and 60 extend into the cover 65 of the core 19. In the form shown, the combined transverse thickness of the fabric material assembly 20 within the slot 23 is greater than the transverse width of the slot 23, resulting in a compressive pinching action thereon. The core 19 is then slid relative to the filter fabric material 20 in a direction, such as indicated by the arrow 66, which is opposite to the direction of the fold of the outer front lap layer 57, so as to avoid interference therewith and while using the projecting ends 62 of the strips 59 and 60 as a depth guide. The core 19 is slid relative to the envelope 54 until its leading end 70 is flush with the folded edge 72 of the envelope 54 which leaves ½ inch of the opposite end 22 of the core 19 extending beyond the opposite folded edge 79 of the envelope 54.

As best shown in FIG. 7, the plug 21 includes a head 80 which has a diameter approximately equal to the diameter of the core 19 and a shank 81 which has a reduced diameter from that of the head, being adapted for interference fit within the cove 65 of the core 19. The shank 81 includes a diametrically extending slot 74 which forms spaced legs 86 and 87 which straddle the opposite sides of the end of the fabric material assembly 20 extending into the cove 65 and adjacent the folded edge 72 of the envelope 54. At this time, a suitable adhesive, such as dissolved Cycolac, as aforesaid, is applied to the junction of the exterior of the envelope 54 along the slot 23, as at 84, to sealingly secure the fabric material 51, as thus, the envelope 54 within the slot 23. The plug 21 is also coated with the adhesive in the area of contact between the core 19 and the envelope 54 for sealingly securing the plug 21 to the end 70 of the core 19.

Figure 10:
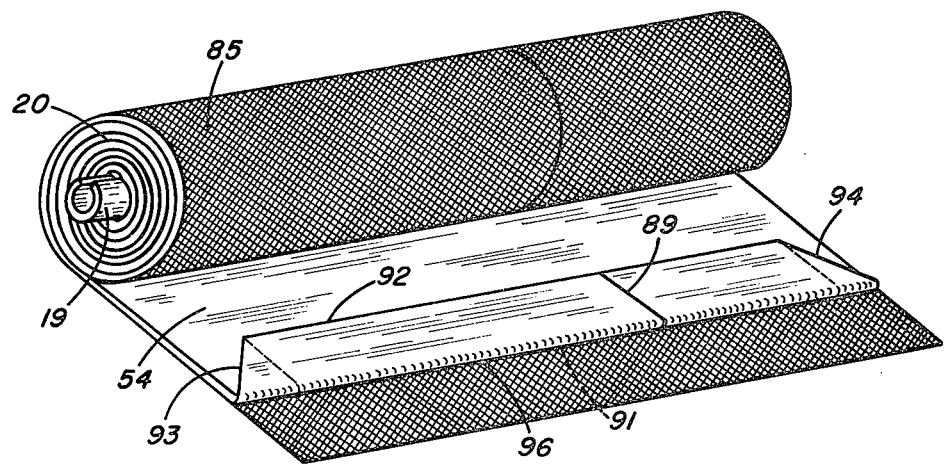
Figure 11:
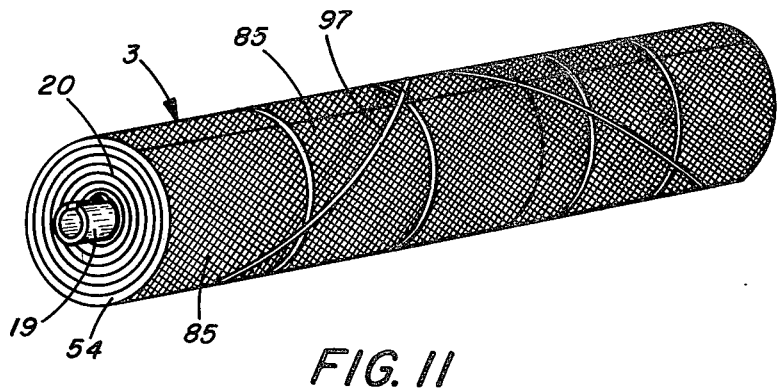

In the form shown in FIG. 8, an external grid strip 85 is provided which is made of the same material as the grip strip 59 and sized so as to have approximately the same width as the grid strips 59 and 60 and also to have an initial length so as to match that of the envelope 54 from end-to-end. The external grid strip 85 is placed along the side of the assembled envelope 54 which has the seam 89 formed by the overlap of the lap layers 56 and 57. The core 19 is then rotated, such as in the direction indicated by the arrow 90, so that the fabric material assembly 20 is wrapped in spiral relation about the core 19 and such that the seam 89 and the grid strip 85 are on the outside (see also FIG. 9). As shown, the external grid 85 is disposed internally of the envelope 54 and wrapped with it to form a separation between the spirally-wrapped layers of the envelope 54. This arrangement results in a comparatively larger filtration area and the use of a much less permeable filtration material which gives a finer degree of filtration without sacrificing flow rate or pressure drop. An inherent benefit of the entire arrangement is an extended life for the entire unit before clogging occurs. The seam 19 is disposed on the outside, as aforesaid, so that the tension caused by the curvature of the lap layers 56 and 57 upon wrapping will cause tight sealing engagement therebetween. When the fabric material assembly 20 is wrapped tightly in the core 19, the positioning of the seam 89 on the outer radius on the outside, as aforesaid, eliminates the need for a cement or sealant to be applied along the seam 89. During this stage of the assembly procedure, a wrinkling usually takes place on the inner curvature of the envelope 54, such as in the back layer 55, which must be controlled. More specifically, there will be a positional change or shift between the internal grid strips 59 and 60 and the back layer 55 in the lengthwise direction of the envelope 54. Thus, when the rolling or wrapping stage is nearly complete, as in FIG. 9, the internal grid strip 59 and 60 should be cut so as to form an edge 91 which is parallel to the outer marginal edge 92 of the envelope 54 and which is a distance F, such as approximately 4 inches, inwardly from the outer marginal edge 92 of the envelope 54. An angular fold is then made across each of the opposite corners of the envelope 54 adjacent the marginal edge 92, as at 93 and 94, and the excess sheet material 51 of the envelope 54 projecting beyond the cut edge 91 is folded over, as at 96, such that the seam 89 is disposed outwardly of such fold as shown in FIG. 10. The wrapping procedure is continued until all of the material forming the fabric material assembly 20 is spirally wrapped on the core 19, and there is at least one complete layer of the external grid strip 85 extending completely around the exterior of the cylindrical shape of the filter module 3, as is shown in FIG. 11. Any excess material forming the external grid strip 85 may be cut away, and a tie string 97, which may be made of any suitable inert material, is tightly tied about the completely assembled filter module 3 so as to insure that there will be no relaxing of the wrapped fabric material assembly 20 which could cause leakage in the end folds 92, 93, and 94 and along the center overlap seam 89 between the outer and inner front lap layers 56 and 57.

Referring now to FIG. 2, and as previously stated, the filter assembly 2 has a tank-type construction being arranged to be self-cleaning. In the form shown, the filter assembly 2 employs only the spirally-wrapped filter module 3 described hereinbefore, and in the embodiment shown in FIG. 2 employs four (4) such filter modules 3a, 3b, 3c, and 3d. It should be pointed out that the construction of the filter system 2 is arranged so as to remove a contaminant which has a specific gravity which is less than the specific gravity of the filtrate or liquid being filtered.

In the form shown, the filter assembly 2 includes a hollow, rectangular tank 101 which is open at the top. The open top of the tank 101 is covered by a top plate 102 which may be secured to the body in any suitable manner so as to form a tight seal therebetween. A baffle assembly 103 is mounted within the body 101 and includes an upright center plate 104 which divides the interior of the body into two filter chambers 105 and 106. The filter modules 3a to 3d are arranged such that two of the modules, such as 3a and 3b are positioned within the filter chamber 105, while the other two filter modules 3c and 3d are positioned within the filter chamber 106. An intake manifold 109 is mounted on the top plate 102 and includes a three-way valve 110 which includes an inlet 111 adapted for connection to a source of contaminated fluid to be filtered. The valve 110 includes outlets 112 and 113 on its opposite sides which are connected in fluid communication to left and right branch conduits 115 and 116, respectively. The branch conduits 115 and 116 include inlets 117, 118, 119 and 120 respectively for conveying the filtered fluid into the interior of the tank 101. Pressure gauges 121 and 122 are connected in the branch conduits 115 and 116 for determining the operating pressure of the system so that the flow rate of the fluid into the tank 101 can be determined and controlled.

A discharge manifold 114 is also mounted on the top plate 102 and includes a T-shaped discharge fitting 125 having an outlet 126 adapted to discharge the filtrate from the system. The discharge manifold 104 includes filtrate discharge outlets 127, 128, 129 and 130 which are connected in fluid communication to the discharge fitting 125, such as by branch conduits 131 and 132, and the respective filter modules 3a, 3b, 3c, and 3d. Each filtrate outlet, such as 127, includes a flow control valve, such as 135, so that the discharge from all of the filter modules 3a, 3b, 3c, and 3d will be the same. Still further, each discharge end, such as 22a, of each core, such as 19a, of each filter module, such as 3a, is connected in fluid communication to the filtrate outlet 127 by a connector 136. A feed chamber 137 is mounted in surrounding relation about the connected end of the filter modules, such as 3a, so as to extend outwardly beyond the associated inlet, such as 117, so that the incoming fluid is directed by the feed chamber into the end of the filter module 3a. The inlet valve 110 is manually-controlled such that the incoming fluid can be fed to either the distribution conduit 115 or the distribution conduit 116, but not both. In this way, the flow path is manually-controlled so that the total feed can be directed to only two of the filter modules, such as through the branch conduit 115, into the filter modules 3a and 3b. As previously stated, the flow control valves, as at 135, on the filtrate outlets 127, can be adjusted such that the inlet feed rate exceeds the discharge rate to achieve a washing action of the filter modules 3a and 3b. More particularly, in any closed system, the total discharge rate must be equal to or greater than the inlet rate. In the present system, the inlet rate is manually-controlled so that the feed into the system is equal the total discharge. Further, the incoming fluid is initially fed into only two of the feed chambers 137 of the filter modules 3a and 3b. Since these two filter modules 3a and 3b can handle only half of the fluid being fed to them, the other portion of the incoming fluid must travel through the length of the filter modules 3a and 3b, as indicated by the arrows at 139, taking the path of least resistance along the exterior grid strips providing a washing action while feeding the other two filter modules 3c and 3d in the chamber 106 adjacent their feed chambers.

A baffle assembly 103 is provided to encourage the settling or floatation, as the case may be, of the filtered or foreign material being removed from the incoming fluid. More particularly, the baffle assembly 103 includes inclined walls as at 105 and 106, which are arranged to direct and concentrate the settling pollutants which form a sludge at the bottom of the compartments 105 and 106. Sludge outlet valves 140 and 141 are shown connecting the compartments 105 and 106 in fluid communication to a sludge discharge conduit 143 for removing the sludge from the interior of the tank 100. The valves 140 and 141 may be arranged to open and close automatically, as well known in the art, such as by a timer, so that the entire system is not only capable of self-cleaning of the filter modules, but can automatically dispose of the sludge collected in the compartments 105 and 106.

We claim:

1. A filter apparatus comprising:

a tank with a bottom, side walls, and an open top having a removable cover constructed and arranged to provide closure means for said open top;

valve means and manifold inlet means located on the upper surface of said cover and constructed and arranged to permit the introduction of fluid to be filtered through said cover at selective locations within said tank;

manifold outlet means located on the upper surface of said cover with each outlet in said cover being in fluid communication with the interior of said filter assembly located within said tank, each said filter assembly having a slotted, hollow elongate core with a closed lower end, the other end of said core being in communication with an outlet in said cover;

closed envelopes of fabric material disposed in spirally wrapped layers about the exterior of each of said cores and constructed and arranged to have interior of said envelopes in fluid communication with the slot of its respective hollow core;

baffle means connected to the bottom of said tank and extending upwardly therefrom with the upper edges thereof spaced apart from the cover of said tank and defining at least two compartments within said tank in fluid communication with each other; and, outlet means in the bottom of each compartment defined by said baffle means whereby sediment collected in the bottom of each of said compartments may be removed therefrom.

2. A filter apparatus in accordance with claim 1 wherein substantially all the component parts of said modular filter assembly are made of non-biodegradable, chemically-inert materials.

3. A filter apparatus in accordance with claim 1 including a porous grid between said layers to enable said fluid to flow through and between said layers.

4. A filter apparatus in accordance with claim 1 wherein said tank includes at least two filter assemblies, at least one filter module is disposed in each of said chambers; and each of said outlet means includes a flow control means for limiting the total output flow from said tank to approximately the total input flow into said tank.

5. A filter apparatus in accordance with claim 4 wherein said flow control means includes means for equalizing the flow through each of said outlet conduits; and selectively actuatable valve means for directing the incoming fluid into less than all said filter modules so that the input to any one module exceeds the output through its associated outlet conduit.

* * * * *